United States Patent [19]

MacDiarmid et al.

[11] Patent Number: 5,403,913
[45] Date of Patent: Apr. 4, 1995

[54] METHODS FOR PREPARING CONDUCTIVE POLYANILINES

[75] Inventors: Alan G. MacDiarmid, Drexel Hill, Pa.; You N. Xia, Cambridge, Mass.; Joanna M. Wiesinger, Ambler, Pa.

[73] Assignee: The Trustees of the University of Pennsylvania, Philadelphia, Pa.

[21] Appl. No.: 105,743

[22] Filed: Aug. 12, 1993

[51] Int. Cl.$^6$ .............................................. C08F 6/00
[52] U.S. Cl. ...................... 528/495; 525/540; 528/422; 528/480; 528/491
[58] Field of Search ............. 525/540; 528/422, 480, 528/491, 495

[56] References Cited

U.S. PATENT DOCUMENTS 5,147,913  9/1992  MacDiarmid et al. ............. 524/104
5,177,187  1/1993  MacDiarmid et al. ............. 528/422

OTHER PUBLICATIONS

Cao et al. "Counter-ion induced processibility of conducting polyaniline and of conducting polyblends of polyaniline in bulk polymers", Synthetic Metals, 48 (1992) 91-97.

Cao et al. "Solution-cast films of polyaniline: Optical-quality transparent electrodes" Appl. Phys. Lett., 60, 271 (1992).

Cao et al. "Magnetic susceptibility of polyaniline in solution in nonpolar organic solvents and in polyblends in poly(methyl methacrylate)", Synthetic Metals, 52 (1992) 193-200.

PCT/US92/09709 "High Molecular Weight Polyanilines and Synthetic Methods Thereof", MacDiarmid et al., Nov. 6, 1992.

*Primary Examiner*—Morton Foelak
*Assistant Examiner*—Shelley A. Dodson
*Attorney, Agent, or Firm*—Woodcock Washburn Kurtz Mackiewicz & Norris

[57] ABSTRACT

Methods for preparing conductive polyaniline forms are provided in which the conductivity of the polyaniline form can be substantially increased by contacting the polyaniline form with a phenolic compound that acts as a secondary dopant for the polyaniline. Generally, a doped polyaniline solution is prepared in which the polyaniline is initially doped by a protonic acid and a doped polyaniline form is then prepared from this solution. The polyaniline form can then be contacted with the phenolic compound in either its vapor or liquid state, however it is preferred that the polyaniline form be maintained in either the gelatinous or solid state during the contacting step. The conductivity of the polyaniline form can be raised by a factor of up to about 500-1000.

23 Claims, 4 Drawing Sheets

METHODS FOR PREPARING CONDUCTIVE POLYANILINES

Portions of this invention were supported by grant #N00014-92-J-1369 from the Office of Naval Research and NSF Grant #DMR-91-20668.

FIELD OF THE INVENTION

This invention relates to polymers of aniline. More specifically, the invention relates to methods for preparing polyaniline having relatively high levels of conductivity. The invention also relates to articles fabricated from the polyaniline made in accordance with the inventive methods.

BACKGROUND OF THE INVENTION

Much attention has recently been directed to polyaniline, due in large part to its excellent stability and the relatively high levels of electrical conductivity of certain of its structural forms. For example, one form of polyaniline known as "emeraldine base" or "polyaniline base" (structure (1), Y=0.5) can be protonated (doped) by dilute aqueous protonic acid such as hydrochloric acid to produce the corresponding salt (structure (2), A=Cl). This salt exhibits conductivities of about 0.001–5 Siemans per centimeter (S/cm) as a compressed powder pellet.

Polyaniline polymers can be processed into a variety of useful shaped articles such as fibers, films, and composites thereof. For many such applications, there is a positive correlation between increased molecular weight for the polyaniline employed and the performance properties of the resultant shaped article.

Currently, problems exist in the successful use of conductive polyanilines. For instance, the conductivity of the resultant polymers is still relatively low and increased conductivity levels would greatly advance the use of these materials in various industries. Also, to some extent, the ability to process high molecular weight polyaniline in the doped form presents problems for the useful application of these conductive polymers.

Melt processing of polyaniline has proven to be ineffective due to the decomposition of the polymer prior to its softening or melting point. Therefore, considerable research has been made in the area of solvents for the polyaniline. The emeraldine base form of polyaniline has been found to be soluble in such solvents as N-methylpyrrolidinone (NMP), certain amines, concentrated sulfuric acid, and other strong acids. However, it is preferred to process the polyaniline in its doped, conductive form to avoid the process of doping the resultant polyaniline form produced from the solution.

Recent advances in the solubility of the doped polyaniline salt are summarized in *Counter-ion induced processibility of conducting polyaniline and of conducting polyblends of polyaniline in bulk polymers,* Cao et al., Synthetic Metals, 48 (1992) 91–97. The authors report that polyaniline can be doped to its salt form and thereafter dissolved in common nonpolar or weakly polar organic solvents. This is accomplished by doping the base polyaniline in a functionalized protonic acid generally denoted as $H^+$ ($M^{--}R$). The resultant doped polyaniline can then be dissolved in such listed solvents as xylene, $CH_3Cl$ [sic, $CHCl_3$], m-cresol, formic acid, and DMSO. The resulting films are reported to have relatively high conductivities. No explanation for the resulting high conductivities is suggested by the authors.

A need exists in the field to develop methods for preparing relatively high conducting polyanilines from either the base or salt form solutions in which the conductivity of the polyaniline can be greatly increased by predictable processing steps. Further, additional processes that can be followed for conversion of the base into a soluble polyaniline salt are also needed to increase processing alternatives.

SUMMARY OF THE INVENTION

The present invention provides for methods of processing polyaniline in which the conductivity of the polyaniline is substantially increased by contacting it with a phenolic compound. In one embodiment, the methods are performed by contacting a substantially solid polyaniline form, which has been initially doped with a protonic acid, having a determinable conductivity, with a phenolic compound under conditions which are effective to increase the conductivity of the polyaniline while maintaining the polyaniline in either a gelatinous or solid state. Preferably, the contacting is either by wetting the polyaniline form with the phenolic compound or by exposing it to the vapors of the phenolic compound. The polyaniline form is preferably prepared from a solution of the doped polyaniline salt.

The conductivity of the polyaniline form prior to treatment with the phenolic compound is generally below about 5, more commonly below about 1, S/cm and this conductivity is increased to at least about 25, generally at least about 50, and more preferably at least about 100, S/cm after treatment with the phenolic compound. Thus, the phenolic compound functions as a secondary dopant for the polyaniline.

In another method, the polyaniline is prepared from solution into a substantially solid material in its base form. This form is rendered conductive by contacting it with a protonic acid. This initially doped form is then contacted with the phenolic compound to substantially increase its conductivity.

BRIEF DESCRIPTION OF THE DRAWINGS

FIG. 1 shows the UV-Vis-NIR spectra for a polyaniline film spin cast from a solution of polyaniline base, camphorsulfonic acid, and chloroform which was subsequently contacted with gaseous m-cresol.

FIG. 2 shows the UV-Vis-NIR spectra for a polyaniline film prepared from a solution of polyaniline base, camphorsulfonic acid and the stated solvent as set forth in Example 2.a. FIG. 2(d) is the spectrum for 2-fluorophenol. The absorbance values are shown on the y-axis and the wavelength is shown on the x-axis in nm.

DESCRIPTION OF THE PREFERRED EMBODIMENTS

The term "aniline" as used herein is intended to include compounds represented by formula (3):

(3)

wherein R and R' are, independently, H, alkyl or alkoxyl having from about 1 to about 6 carbon atoms. The term "polyaniline" as used herein is intended to encompass the polymers produced upon the polymerization of the compounds having formula (3), including N-substituted derivatives thereof having alkyl or other organic functional groups attached to one or more nitrogens of a polyaniline chain.

Generally, the preparation of polyaniline comprises mixing aniline, protonic acid, and a polymerization agent or initiator in aqueous media, preferably at a temperature above about $-5°$ C., and then recovering the resultant product from the mixture. Representative examples of such preparatory methods and the polyanilines made therefrom are shown in U.S. Pat. Nos. 5,147,913 and 5,177,187, both to MacDiarmid et al., both of which are incorporated herein in their entirety. Specifically, a polymerization agent, such as ammonium persulfate, is presented in a protonic acid solution, such as a 1M HCl solution, and this solution is added to aniline also dissolved in about 1M HCl, and the resulting solution maintained at the reaction temperature. The precipitate formed is collected and washed with about 1M HCl to yield emeraldine hydrochloride. This salt may be converted to emeraldine base by treatment with about 0.1M $NH_4OH$. Higher molecular weight polyanilines can be prepared in accordance with the procedures set forth in allowed application Ser. No. 07/789,095 filed Nov. 7, 1991, now U.S. Pat. 5,276,112, to MacDiarmid et al. and in PCT application PCT/US92/09709, filed Nov. 6, 1992 to MacDiarmid et al., which are both incorporated herein in their entirety. Generally, the preparation comprises mixing aniline, protonic acid, salt, and a polymerization agent or initiator in aqueous media, preferably at a temperature below about $-10°$ C., and then recovering the resultant product from the mixture. Useful salts include lithium chloride, sodium chloride, ammonium sulfate and mixtures thereof.

The polyaniline precipitate which is formed is collected and washed typically with protonic acid and/or organic solvent to provide a salt having, for example, formula (4), where A is an anionic species and Y is from 0 to 1. It will be appreciated that the exact formula of the polyaniline product will depend upon the particular starting materials and reaction conditions employed.

(4)

Polyaniline salts of formula (4) can be converted to bases having formula (5) by treatment with aqueous base comprising, for example, ammonium hydroxide. The resulting polyaniline base, preferably in the emeraldine oxidation state, can then be recovered by known techniques such as washing with aqueous base and organic solvents followed by vacuum drying.

(5)

As will be recognized, it is difficult to precisely characterize polyanilines. For example, the exact position of the protonated nitrogens in the polyaniline backbone cannot be unequivocally assigned; resonance structures may be significant. It is preferred that the polyaniline salts and polyaniline bases of the present invention be generally in accordance with structures (4) or (5), respectively. It is also preferred that Y be between about 0.4 to about 0.6, as determined by titration of the polymer salt with titanium trichloride. It is particularly preferred that Y be about 0.5, as it is known that unsubstituted polyanilines wherein Y is about 0.5 exhibit greater conductivity than such polymers having different Y values.

In accordance with one embodiment of the present invention, the polyaniline in its emeraldine base form is initially doped with a protonic acid and dissolved in a suitable solvent. The polyaniline base and protonic acid are generally in particulate form and are added to the solvent in its liquid form; preferably enough acid is provided to substantially dope the base polyaniline. A doped, conductive polyaniline form is then prepared from this solution using conventional techniques such as, for example, spin casting, fiber casting, dip coating, and film forming to result in such forms as thin and thick films, generally from about 0.05 μm to about 1 mm, fibers, and coatings on various substrates. Exemplary methods are set forth in allowed U.S. application Ser. No. 07/789,095 filed Nov. 7, 1991, now U.S. Pat. No. 5,276,112, to MacDiarmid et al. This polyaniline form is then contacted with a phenolic compound that functions as a secondary dopant to increase its conductivity.

Protonic acids useful in the initial doping of the polyaniline base according to the present invention have the general formula $H_xA_y$ wherein x and y are each 1-8, H is $H^+$, and A is an anionic moiety such as, for example, $Cl^-$, $Br^-$, $I^-$, $PO_3^-$, $SO_4^{2-}$, $PO_4^{3-}$, $ClO_4^-$, $CH_3SO_3^-$, and $X^--R$ where X is an anionic moiety such as $SO_3^-$ and R is $CCl_3$, $CF_3$, a halogen such as chlorine or fluorine, or an alkyl or aryl having from about 1-30, preferably from about 1-20 carbon atoms and wherein the alkyl or aryl can be substituted with a halogen or an alkyl or aryl having from 1-20, preferably 1-10 carbon atoms. If the R group is an aryl group, then it is preferably benzyl and it preferably is monosubstituted with hydroxyl, chlorine, fluorine, $CCl_3$, $CF_3$, $C_nF_{2n-1}$ where n is from 1 to 8, and an alkyl having up to 20 carbon atoms. Useful anionic moieties further include: polymeric anions such as polystyrene or polyvinylsulfonate; and thermally stable anions such as $B_{12}H_{12}^{2-}$. Another group of protonic acids includes those of the general formula R—COOH wherein R is H, $CCl_3$, and $C_nF_{2n-1}$ where n is from 1 to 8. Preferred protonic acids include hydrochloric acid, hydrobromic acid, sulfuric acid, methane sulfonic acid, benzene sulfonic acid, pare-toluene sulfonic acid, camphorsulfonic acid, dodecyl sulfonic acid, dodecyl benzene sulfonic acid, and combinations thereof; hydrochloric acid and sulfuric acid are particularly preferred. Hydrobromic acid is somewhat less preferred to the extent that they it provide aromatically halogenated products.

The solvent for the polyaniline is one which can solubilize the doped polyaniline to a determinable extent, preferably to at least about 1 weight percent, more preferably to at least about 5 weight percent. Suitable solvents include such compounds as chloroform, acetic acid, N-methylpyrrolidinone (NMP), and dimethylformamide (DMF).

The polyaniline forms that are produced from the solution of the doped polyaniline are considered to be substantially solid polyaniline. The various methods for preparing these forms, as set forth previously, provide a polyaniline form that contains residual solvent. Typically, the solvent content decreases by way of evaporation until the polyaniline form reaches an equilibrium condition. By "substantially solid" it is meant that the polyaniline form that is produced can contain the solvent from its equilibrium condition up to its saturation point, thus not being considered to be a solution of the polyaniline, but rather either a gel or a solid. Generally, the amount of solvent in the substantially solid polyaniline form at its equilibrium condition will be from about 5-25, more commonly from about 10-15, weight percent. The amount of solvent present in the gel polyaniline form can be up to about 95, more commonly up to about 85 weight percent of the polyaniline form.

The doped polyaniline form will have a measurable or determinable conductivity. This conductivity is generally below about 10, commonly below about 5, more commonly below about 1, and even more generally below about 0.1, Siemans/cm (s/cm).

The doped polyaniline form is then contacted with a phenolic, preferably a substituted phenolic, compound under conditions which are effective to increase the conductivity of the polyaniline form yet which conditions are not effective to produce a solution of the polyaniline form. The substituted phenolic compound can be a mono- or di-substituted phenol where the substituent group, or groups, includes hydroxyl, halogens, preferably chlorine and fluorine; and alkyls and alkoxys, preferably having from 1-40, more preferably from 1-20, and even more preferably from 1-10 carbon atoms, and even more particularly methyl and ethyl alkyls and alkoxys; with the alkyls being preferred over the alkoxys. The substituent group can be the same or different on a disubstituted phenol. Preferred phenolic compounds are monosubstituted phenols. Preferred phenolic compounds include phenol, cresol, 3-ethylphenol, 2-chlorophenol, 2-fluorophenol, and mixtures thereof.

The contacting of the polyaniline form with the phenolic compound can comprise any processing technique, however it is preferred that the polyaniline form remain in either the solid or gelatinous state, and not the liquid state. In one embodiment, the polyaniline form is wetted with the phenol compound. The wetting step can include placing the polyaniline form into the liquid phenolic compound or adding the liquid phenolic compound to the polyaniline form. The polyaniline form will swell upon wetting with the phenolic compound. In another embodiment, the contacting is accomplished by presenting the polyaniline form in a gaseous atmosphere containing the phenolic compound. If the phenolic compound is sufficiently volatile, this contacting can occur at ambient conditions, however, for less volatile pheolic compounds, either the temperature, pressure, or both can be increased to improve the contacting step.

The contacting step, either the wetting procedure or the vapor contact procedure, is continued for a time sufficient to increase the conductivity of the polyaniline form by at least a factor of 2, preferably by at least a factor of 10, more preferably by at least a factor of 50, and even more preferably by at least a factor of 100, and in some cases by a factor of at least 500, or even more preferably by a factor of at least 1000. Resulting conductivities are at least about 5, preferably at least about 25, more preferably at least about 50, and even more preferably at least about 100, S/cm. Generally, the conductivity is below about 200 S/cm.

Although not wishing to be bound by any theory of invention, it is believed that the dramatic increase in conductivity of the polyaniline structure is attributable to the changing of the polyaniline from a coil-like amorphous molecular structure to a rod-like crystalline molecular structure. Analysis of the electronic spectra for the polyaniline film before and after treatment with the phenolic compound shows a dramatic shift in the spectra from an initial strong absorption peak at about 820 nm and no free carrier tail beyond about 1000 nm to a small absorption peak at about 820 nm with a strong free carrier tail beyond about 1000 nm. The absorbance for the amorphous polyaniline prior to contact with the phenolic compound at about 820 nm is at least about 0.6, generally from about 0.6–0.7 and at about 2500 nm is below about 0.3, generally from about 0.1 to about 0.3. The absorbance for the crystalline polyaniline after contact with the phenolic compound at about 820 nm is from below about 0.5, generally from about 0.1 to about 0.5, and at about 2500 nm is at least about 0.5, generally from about 0.5 to about 1. This shift in the spectra is indicative of delocalized electrons in the polaron band. The noticed increase in crystallinity can also be confirmed by x-ray diffraction analysis.

In another embodiment of the present invention the polyaniline form having increased conductivity is directly produced from a solution of the doped polyaniline containing the phenolic compound. The polyaniline base and the dopant protonic acid, generally in particulate form, are added to the phenolic compound, preferably in its liquid state, provided that the phenolic compound does not include cresol or the protonic acid does not include a functionalized protonic acid. Preferred phenols thus include 3-ethylphenol, 2-chlorophenol, 2-fluorophenol, and mixtures thereof. Preferred protonic acids include hydrochloric acid, hydrobromic acid, sulfuric acid, and combinations thereof. The polyaniline form produced from this solution of the doped polyaniline possesses a dramatic increase in its conductivity in comparison to a similarly produced polyaniline using a non-phenolic compound solvent. Thus, the phenolic compound solvent acts as a secondary dopant for the polyaniline. The resulting conductivity is similar to those polyaniline forms treated with the phenolic compound by the vapor phase or wetting contact methods. The presence of the phenolic compound in the solution causes a noticeable increase in the viscosity of the solution, which is also indicative of a more rod-like structure.

In another embodiment of the present invention, the polyaniline form is prepared in its base form, without any doping, and subsequently doped with the protonic acid and further contacted with a secondary dopant, the phenolic compound, to prepare a highly conductive polyaniline form. In this method, the base form of the polyaniline is prepared as a polyaniline form using known techniques. Generally, the base is dissolved in an appropriate solvent, such as NMP, and a fiber, film, or other form is prepared from the solution, preferably a film. This base polyaniline form is then initially doped with any of the stated protonic acids set forth for use with the vapor or wetting procedures. This can be accomplished by conventional techniques known in the art such as contacting the base polyaniline form with the protonic acid by vapor contact or by wetting. The resultant doped polyaniline form is then treated with the stated phenolic compounds used in the above-described vapor and wetting contacting methods in the same manner to provide polyaniline forms having similar conductivities.

The processes of this invention are further illustrated in the following examples, which are not intended to be limiting of this invention.

EXAMPLES

In the following examples, the conductivity of the polyaniline films was measured by a four probe method. The film thickness (t) and width (d) were measured. Four platinum contacts were made along the film, not at points, but rather along the entire span of the width of the film. The platinum contacts were secured against the film by fastening a plastic plate over the film and the contacts. The current (i) was measured between the two outermost probes and the voltage (v) was measured between the two innermost probes which had a measured distance (1). The conductivity was determined by the formula:

$$\sigma = (1 \times i)/(d \times t \times v)$$

The electronic UV/Vis/NIR (Ultraviolet-visible-near infrared) absorption spectra were measured by using a Perkin-Elmer Lambda 9 spectrometer controlled by a Perkin-Elmer series 7700 computer with a CUV-3 software applications program.

EXAMPLE 1

Preparation of Vapor Phase Secondary Doped Polyaniline

Approximately 0.41 g of the polyaniline emeraldine base was mixed in a mortor with approximately 0.52 g camphorsulfonic acid in a molar ratio of base to acid of 1:2, to produce fully doped polymer, and about 0.05 g of this mixture was dissolved in 2 ml chloroform with stirring for about 2 minutes. The solution was sonicated at 25° C. for 15 hours to obtain a green homogeneous solution and filtered through a 0.45 $\mu$m filter.

A spin coated doped film was prepared from the filtered solution onto a pre-cleaned quartz plate. The spin speed was set at about 1000 rpm and about 5 drops (about 0.01 ml/drop) were placed on the plate and after about 20 seconds, the spin speed was increased to about 2000 rpm for another 2 minutes to dry the film. The film had a thickness of about 0.3 $\mu$m and a square of about 1 cm $\times$ 1 cm was made for the testing. Two aluminum contacts, made from aluminum foil, were attached to opposite sides of the film using tape.

The quartz plate, with the polyaniline film, was placed over a 20 ml vial. About 0.5 ml m-cresol was placed in the bottom of the vial. The m-cresol vapors were allowed to contact the film for about 16 minutes at about 25° C.

The chemical and physical changes in the doped polyaniline film were measured by both resistance and UV-Vis-NIR spectra. The surface resistance was measured by connecting the aluminum contacts to a multimeter and was about 240 K$\Omega$ prior to treatment with m-cresol and decreased to about 1.5 K$\Omega$ after the contacting with m-cresol for 16 minutes. The dramatic decrease in resistivity is indicative of a corresponding increase in conductivity of the treated film thus verifying the effect of the m-cresol as a secondary dopant.

Figure 1A:
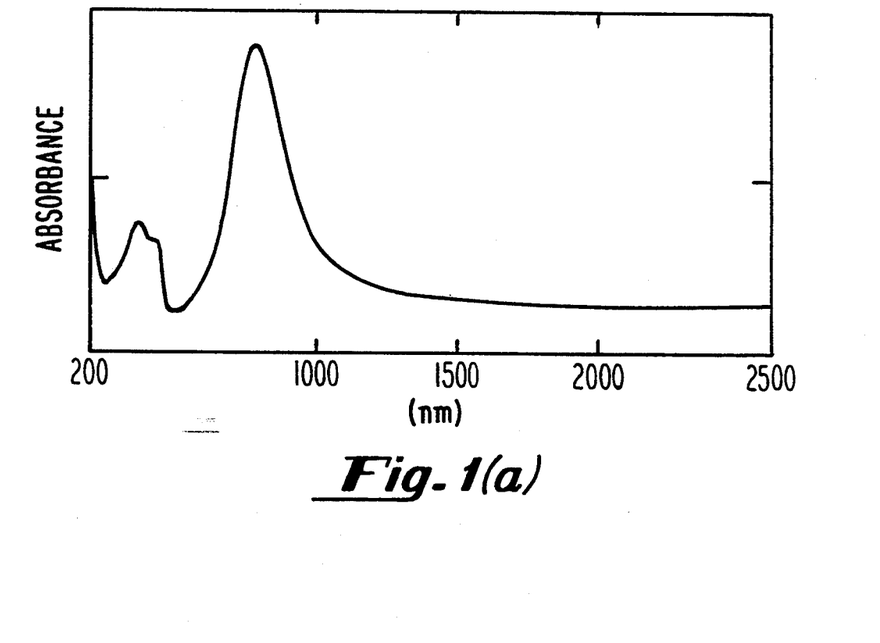
FIG. 1(a) is the spectrum for the cast film prior to treatment with m-cresol.
Figure 1B:
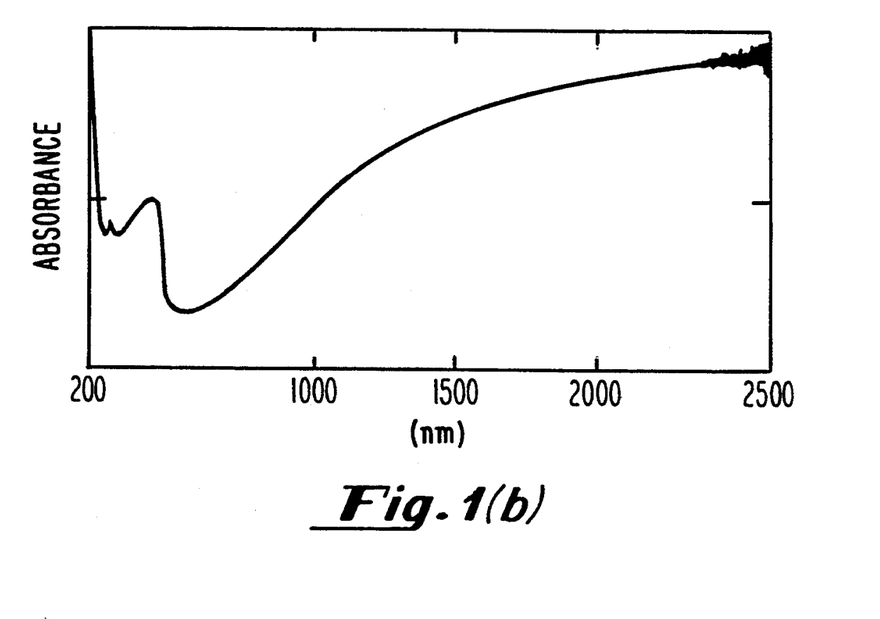
FIG. 1(b) is the spectrum after treatment with the m-cresol.

The UV-Vis-NIR spectra for the pre- and post-m-cresol treatment is shown in FIGS. 1(a) and 1(b). The spectra indicate that the absorption at about 820 nm which is present in the initial film is substantially removed after the treatment with the m-cresol. The m-cresol treated film also displays a prominent free carrier tail beginning at about 1000 nm.

Figure 1C:
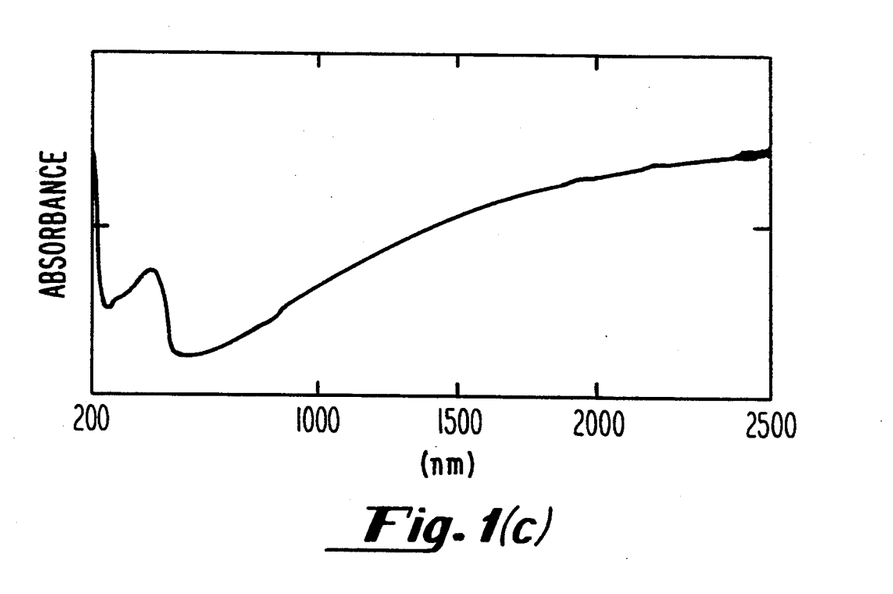
FIG. 1(c) is the spectrum after drying the treated film.

The weak absorption at about 280 nm in FIG. 1(b) is due to the remaining m-cresol in the film. The m-cresol was removed by heating the film on a hot plate at about 80° C. for about 30 minutes. The spectra, shown in FIG. 1(c), remains substantially unchanged even after removal of the m-cresol. The film, maintained at about 25°

Figure 1D:
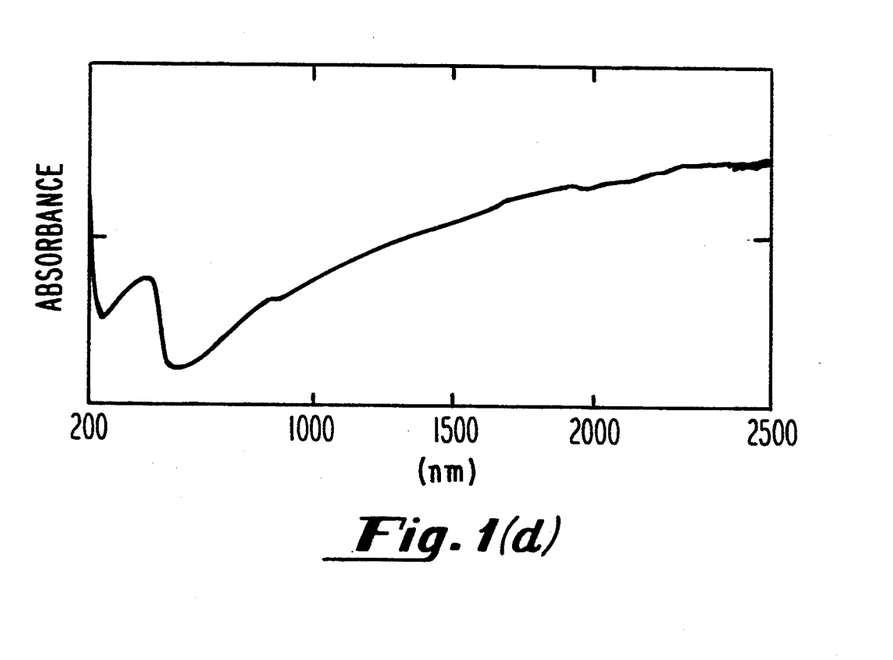
FIG. 1(d) is the spectrum after contacting the dried film with chloroform vapor. All absorbance values are from 0 to 1 on the y-axis.
Figure 2A:
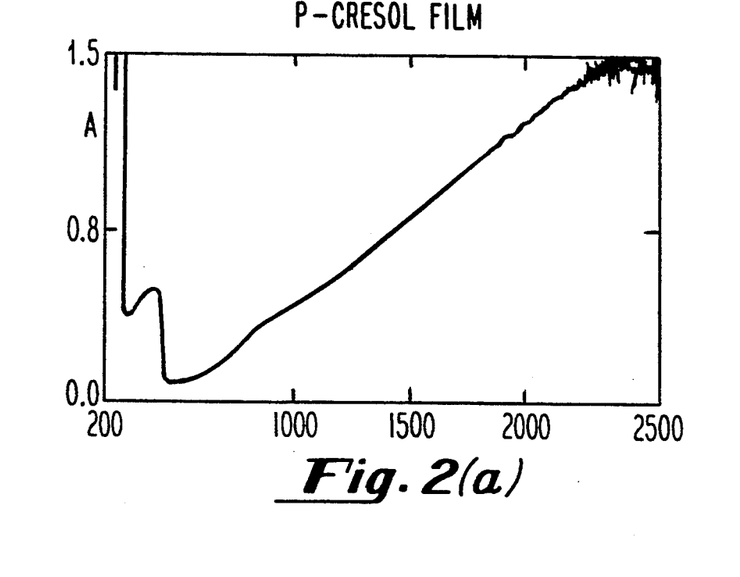
FIG. 2(a) is the spectrum for p-cresol.
Figure 2B:
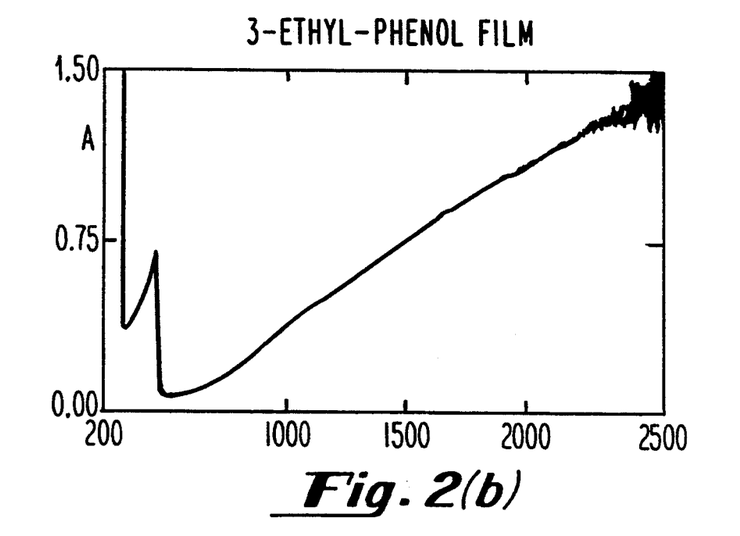
FIG. 2(b) is the spectrum for 3-ethylphenol.
Figure 2C:
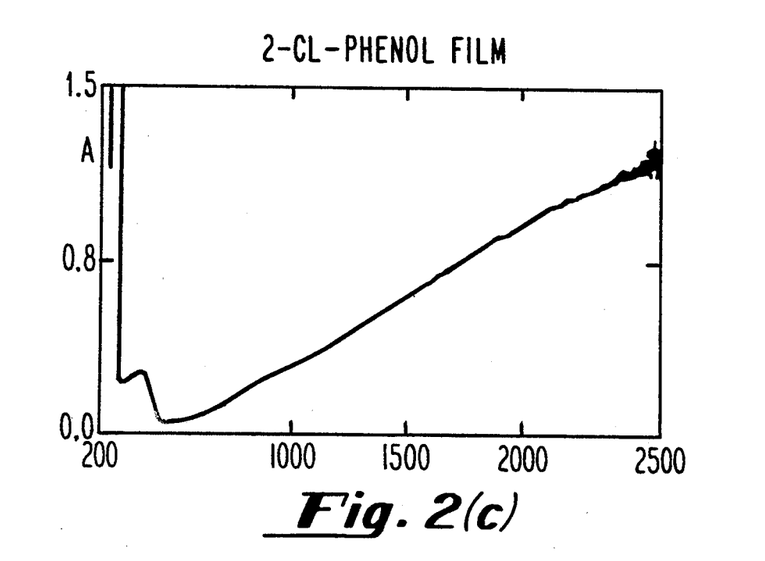
FIG. 2(c) is the spectrum for 2-chlorophenol.
Figure 2D:
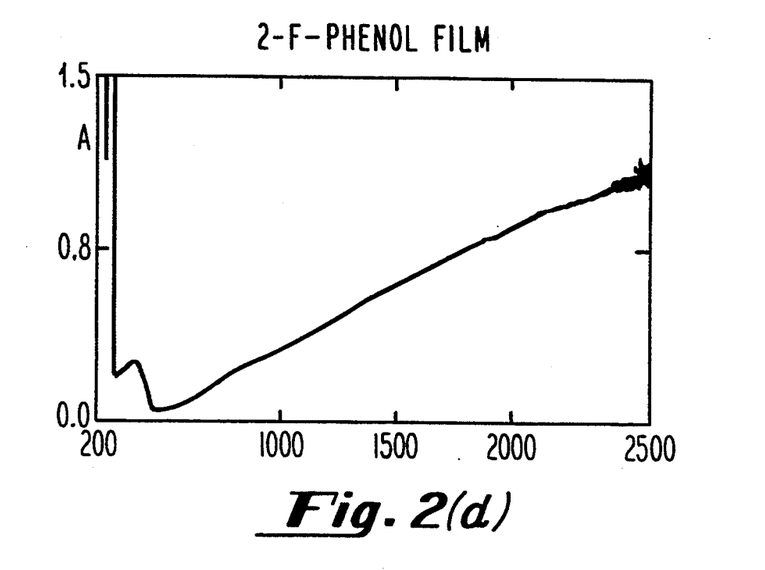

C., was then contacted with refluxing chloroform vapor at about 50° C. for about 15 minutes and found not to dissolve in the presence of such vapors suggesting a crystalline structure. The spectra for the film after contacting with the chloroform vapor is shown in FIG. 1(d).

The crystalline structure of the treated film was verified in another experiment. A spin-cast film made in accordance with this Example was placed on top of a vial containing m-cresol. The vial had a smaller diameter than the film, thus only a portion of the doped polyaniline film was exposed to the m-cresol vapors. After about 15 minutes at ambient conditions, the quartz plate and adherent film were placed in refluxing chloroform vapor at about 50° C. for about 10 minutes. The doped polyaniline film that was not exposed to the m-cresol vapors dissolved completely while the exposed film portion was insoluble.

EXAMPLE 2

Preparation of Conductive Polyanilines from Solutions of the Phenolic Compound 2.a. Using Camphorsulfonic Acid A series of experiments were conducted using camphorsulfonic acid as the protonic acid and various solvents to dope and dissolve the emeraldine base polyaniline. The solutions were used to prepare thin films and the conductivity of the films was then determined.

The polyaniline solutions were prepared by mixing 0.41 g emeraldine base powder (1.13 mmol) with 0.524 g d,l-camphor sulfonic acid (2.26 mmol) with a mortar and pestle. After grinding for about 30 minutes a black homogeneous mixture of fully doped polyaniline salt was obtained.

About 0.05 g of the polyaniline salt was added stepwise over a period of about 10 minutes using a magnetic stirring apparatus into about 2 ml solvent to make about a 2.5% wt. solution. This solution was sonicated for about 10 hours at about 25° C., however the temperature of the bath generally increased up to about 38° C. upon the sonication process. Green solutions resulted.

Films were made from the solutions on glass slides by pipeting about 0.5 ml of the solution onto the slide and evaporating the solvent by heating the slide to about 80° C. The films were cut into desired shapes and had a thickness ranging from about 0.5–100 μm.

The conductivity results from using various solvents is shown in Table 2.1. The phenol substituted solvents all had conductivities of greater than 2 S/cm up to about 170 S/cm. The UV/Vis/NIR spectra for the p-cresol, 3-ethylphenol, 2-chlorophenol, and 2-fluorophenol are shown in FIGS. 2(a)–(d).

TABLE 2.1

| SOLVENT | $\sigma$(s/cm) |
| --- | --- |
| m-cresol | 150 |
| p-cresol | 150 |
| 3-ethylphenol | 120 |
| 2-Cl-phenol | 170 |
| 2-F-phenol | 160 |
| 3-isopropyl-phenol | 30 |
| 2-OCH$_3$-4-CH$_3$-phenol | 2 |
| acetic acid | 7 |
| chloroform | 0.1 |
| NMP | 0.01 |
| DMF | 0.1 |
| benzyl alcohol | 0.1 |

2.b. Using Hydrochloric Acid

About 6 ml of m-cresol was saturated with HCl by bubbling HCl gas through the m-cresol liquid for about 10 minutes. About 50 mg of emeraldine base polyaniline was then added to the mixture and this solution was sonicated for about 24 hours. The sonicated solution was then filtered through glass wool and poured onto a glass slide and dried at about 30° C. for about 16 hours to produced high quality flexible films having a conductivity of about 26 S/cm.

2.c. Using Sulfuric Acid

About 50 mg of emeraldine base polyaniline was slowly dissolved in about 5 ml of m-cresol, then about 0.015 ml of concentrated sulfuric acid (about 98% wt.) was quickly added to that solution. The solution was sonicated for about 12 hours and then filtered through glass wool and poured onto a glass slide and allowed to dry for about 16 hours at about 30° C. High quality flexible films were obtained having a conductivity of about 40 S/cm.

EXAMPLE 3

Preparation of Wetted Secondary Doped Polyaniline 3.a. Preparation of Free-Standing Film From Chloroform Solution About 0.30 g of polyaniline powder, in the emeraldine base form, and 0.38 g of camphor sulfonic acid (the appropriate molar ratio to give complete doping of the polymer) were added quickly to 10 ml of chloroform and stirred vigorously for a few minutes. The resulting mixture was blue in color. It was then sonicated for 2–4 hours and then stirred for about 16 hours. The resulting solution was green in color and homogenous and nonviscous. It was filtered through glass wool, then poured onto several microscopic slides, which were placed in under a laboratory fume hood. The chloroform evaporated in about 10 minutes. Then, 2–3 additional layers of the solution were put on each slide and the chloroform was evaporated. The dry films were carefully peeled off the slides with a razor blade and were cut with scissors into a film having a dimension of about 10×15 mm. The film was brittle, and had a conductivity of $10^{-1}$ S/cm.

3.b. Moistening of Free-Standing Film With m-Cresol

The pure film of 3.a. was placed in a Petri dish. It was moistened with 1–2 drops (0.01 ml/drop) of m-cresol whereupon it visibly swelled but no green coloration was observed on the glass around the film. If this had occurred it would indicate that some of the polymer had dissolved in the m-cresol to form a solution which drained from the film.

After about 4 hours the film was placed in an oven at about 60° C. for about 16 hours to evaporate excess m-cresol. The resulting free-standing film was much more flexible than before the m-cresol treatment. Its conductivity had increased 2 to 3 orders of magnitude to about 75 S/cm.

3.c. Moistening of Free-Standing Film With 3-ethylphenol and 2-chloro-phenol

The film made in accordance with the procedure of 3.a. was wetted in the same way as in accordance with the procedure of 3.b. with 3-ethylphenol and 2-chlorophenol. The resulting conductivities of the treated films were 60 S/cm and 80 S/cm, respectively.

3.d. Critical Moistening Limit

In a separate experiment it was found that a piece of such film as made in accordance with 3.a. would take up to about 14 times its weight of m-cresol before signs of solubility of the film in m-cresol (as evidenced by a green coloration on the glass around the film) was observed. This is not surprising since it is known that in polyaniline films considerable crosslinking between chains is present; on adding certain liquids, swelling occurs to produce a gel, a state of matter intermediate between a solid and a fluid.

EXAMPLE 4

Preparation of Base Polyaniline Film Subsequently Doped With Protonic Acid and Secondary Dopant Phenolic Compound A solution of about 2% wt. emeraldine base in NMP was prepared by slowly adding about 0.2 g emeraldine base polyaniline to about 10 g of NMP over a period of about 30 minutes. This solution was then stirred for about 6 hours and a homogeneous blue solution was obtained which was filtered through a funnel using Whatman #41 filter paper.

A thin film of base polyaniline was prepared by spin casting the above solution onto a precleaned quartz plate. About 0.5 ml of the solution was dropped onto the quartz plate spinning at about 800 rpm. After about 90 seconds, the spin rate was raised to about 1200 rpm for about 2 minutes, and then raised to about 1800 rpm for an additional 2 minutes, and finally raised to about 2300 rpm for another 2 minutes.

The resulting thin film, while attached to the quartz plate, was placed in a Petri dish containing about 10 ml freshly prepared 1M aqueous camphorsulfonic acid. After about 6 hours the quartz plate with the attached polyaniline film was carefully dried with a tissue. The surface resistance was measured using the technique described in Example 1 and was found to be about 26 K$\Omega$/cm$^2$.

The film was then exposed to m-cresol vapor for about 10 minutes as described in Example 1. The resulting resistance was measured to be about 1.7 K$\Omega$/cm$^2$.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A method for processing polyaniline, comprising contacting a substantially solid polyaniline having a determinable conductivity with a phenolic compound comprising phenol, or mono- or disubstituted phenolic compound wherein said substituent comprises hydroxyl, halogen and an alkyl or alkoxy having 1-20 carbon atoms under conditions which are effective to increase said conductivity by at least a factor of 10 while maintaining said polyaniline in either a gelatinous or solid state.

2. The method of claim 1 wherein said contacting comprises wetting said polyaniline with said phenolic compound up to about the saturation point of said polyaniline in said phenolic compound.

3. The method of claim 2 wherein the phenolic compound comprises a mono- or di-substituted phenolic compound, wherein said substituent comprises hydroxyl, a halogen, and an alkyl having 1-20 carbon atoms.

4. The method of claim 3 wherein the phenolic compound comprises a mono-substituted phenolic compound.

5. The method of claim 2 wherein the phenolic compound consists of a mono- or di-substituted phenolic compound, wherein said substituent group is selected from the group consisting of hydroxy, halogen, and alkyl having 1-20 carbon atoms.

6. The method of claim 2 wherein said phenolic compound is a mono-substituted phenolic compound and wherein said substituent is selected from the group consisting of hydroxy, chlorine, fluorine, methyl, and ethyl.

7. The method of claim 2 wherein said phenolic compound comprises cresol, 3-ethylphenol, 2-cholophenol, 2-fluorophenol, phenol, or mixtures thereof.

8. The method of claim 1 wherein said contacting consists essentially of exposing said polyaniline to said phenolic compound wherein said phenolic compound is in the gaseous state.

9. The method of claim 8 wherein the phenolic compound comprises a mono- or di-substituted phenolic compound, and wherein said substituent comprises hydroxyl, a halogen, and an alkyl having 1-20 carbon atoms.

10. The method of claim 9 wherein the phenolic compound comprises a mono-substituted phenolic compound.

11. The method of claim 8 wherein the phenolic compound consists of a mono- or di-substituted phenolic compound, and wherein said substituent group is selected from the group consisting of hydroxyl, a halogen, and alkyl having 1-20 carbon atoms.

12. The method of claim 8 wherein said phenolic compound is a mono-substituted phenolic compound and wherein said substituent is selected from the group consisting of hydroxyl, chlorine, fluorine, methyl, and ethyl.

13. The method of claim 8 wherein said phenolic compound comprises cresol, 3-ethylphenol, 2-cholophenol, 2-fluorophenol, phenol, or mixtures thereof.

14. A method for selectively increasing the conductivity of polyaniline, comprising:
  (a) providing a solution of polyaniline in the emeraldine oxidation state, a dopant comprising a protonic acid, and a solvent for the polyaniline;
  (b) preparing a substantially solid polyaniline form from the solution of step a) having a conductivity of below about 5 S/cm; and
  (c) contacting said polyaniline form with a phenolic compound comprising phenol, or mono- or di-substituted phenolic compound, wherein said substituent comprises hydroxyl, a halogen and an alkyl or alkoxy having 1-20 carbon atoms under conditions which are effective to increase said conductivity to at least about 25 S/cm while maintaining said polyaniline form in either the gelatinous or solid state.

15. The method of claim 14 wherein said conductivity is increased to at least about 50 S/cm by the contacting with the phenolic compound.

16. The method of claim 14 wherein said conductivity is increased to at least about 100 S/cm by the contacting with the phenolic compound.

17. The method of claim 16 wherein said conductivity of said polyaniline form of step (b) is below about 1 S/cm.

18. The method of claim 14 wherein said dopant protonic acid is selected from the group consisting of hydrochloric acid, hydrobromic acid, sulfuric acid, methane sulfonic acid, benzene sulfonic, toluene sulfonic acid, and combinations thereof.

19. The method of claim 14 wherein said solvent for the polyaniline comprises chloroform, NMP, acetic acid and DMF.

20. The method of claim 19 wherein said phenolic compound comprises a mono- or di-substituted phenol, wherein said substituent comprises hydroxyl, a halogen, or an alkyl having 1–20 carbon atoms.

21. The method of claim 19 wherein said phenolic compound is a mono-substituted phenol and wherein said substituent is selected from the group consisting of hydroxyl, chlorine, fluorine, methyl, and ethyl.

22. The method of claim 19 wherein said phenolic compound comprises cresol, 3-ethylphenol, 2-cholophenol, 2-fluorophenol, phenol, or mixtures thereof.

23. A method of increasing the conductivity of an emeraldine base polyaniline form, comprising:

(a) providing a polyaniline form prepared from a solution comprising emeraldine base polyaniline;
(b) preparing a substantially solid polyaniline form from said solution, said polyaniline form comprising polyaniline in the emeraldine base state;
(c) doping said polyaniline form with a protonic acid, said doped polyaniline form having a determinable conductivity and being in a substantially solid form;
(d) increasing the conductivity of said doped polyaniline form by contacting said doped polyaniline form with a phenolic compound comprising phenol, or mono- or di-substituted phenolic compound, wherein said substituent comprises hydroxyl, a halogen, and an ankyl or alkoxy having 1–20 carbon atoms under conditions which are effective to increase said conductivity by at least a factor of 10 while maintaining said polyaniline in either a gelatinous or solid state.

* * * * *